(12) United States Patent
Nakamura et al.

(10) Patent No.: US 9,170,689 B2
(45) Date of Patent: Oct. 27, 2015

(54) TOUCH PANEL AND DISPLAY DEVICE INCLUDING THE SAME

(75) Inventors: Tatsuya Nakamura, Tokyo (JP); Seiichiro Mori, Tokyo (JP); Takashi Miyayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 83 days.

(21) Appl. No.: 13/617,203

(22) Filed: Sep. 14, 2012

(65) Prior Publication Data

US 2013/0093721 A1 Apr. 18, 2013

(30) Foreign Application Priority Data

Oct. 12, 2011 (JP) .................. 2011-224533

(51) Int. Cl.
*G06F 3/041* (2006.01)
*G06F 3/044* (2006.01)

(52) U.S. Cl.
CPC ............... *G06F 3/044* (2013.01); *G06F 3/041* (2013.01); *G06F 2203/04103* (2013.01)

(58) Field of Classification Search
CPC ................................ G06F 3/041; G06F 3/045
USPC .................................................. 345/173–174
See application file for complete search history.

(56) References Cited

U.S. PATENT DOCUMENTS

| | | | |
|---|---|---|---|
| 5,844,506 A | 12/1998 | Binstead | |
| 2010/0026664 A1 | 2/2010 | Geaghan | |
| 2010/0028811 A1 | 2/2010 | Geaghan | |
| 2010/0060602 A1* | 3/2010 | Agari et al. | 345/173 |
| 2010/0253647 A1* | 10/2010 | Agari et al. | 345/174 |
| 2012/0098759 A1* | 4/2012 | Chang | 345/173 |
| 2012/0313893 A1 | 12/2012 | Geaghan | |

FOREIGN PATENT DOCUMENTS

| | | |
|---|---|---|
| JP | S58-191035 A | 11/1983 |
| JP | 9-511086 | 11/1997 |
| JP | 2007-047990 A | 2/2007 |
| JP | 2010-257178 | 11/2010 |
| WO | 95/27334 | 10/1995 |
| WO | 2010/014679 A2 | 2/2010 |

OTHER PUBLICATIONS

The First Office Action issued by the Chinese Patent Office on Mar. 3, 2015, which corresponds to Chinese Patent Application No. 201210385672.X and is related to U.S. Appl. No. 13/617,203, with English language partial translation.
An Office Action; "Notification of Reason(s) for Refusal," issued by the Japanese Patent Office on Jun. 30, 2015, which corresponds to Japanese Patent Application No. 2011-224533 and is related to U.S. Appl. No. 13/617,203; with English language partial translation.

* cited by examiner

*Primary Examiner* — Nicholas Lee
*Assistant Examiner* — Abdul-Samad A Adediran
(74) *Attorney, Agent, or Firm* — Studebaker & Brackett PC

(57) ABSTRACT

A touch screen of a touch panel includes plural detection column wirings and plural detection row wirings that cross the detection column wirings. Dummy column wirings having a similar configuration to that of the detection column wirings are arrayed at further outer sides of outermost detection column wirings out of the plural detection column wirings. Dummy row wirings having a similar configuration to that of the detection row wirings are arrayed at further outer sides of outermost detection row wirings out of the plural detection row wirings.

9 Claims, 14 Drawing Sheets

F I G . 1
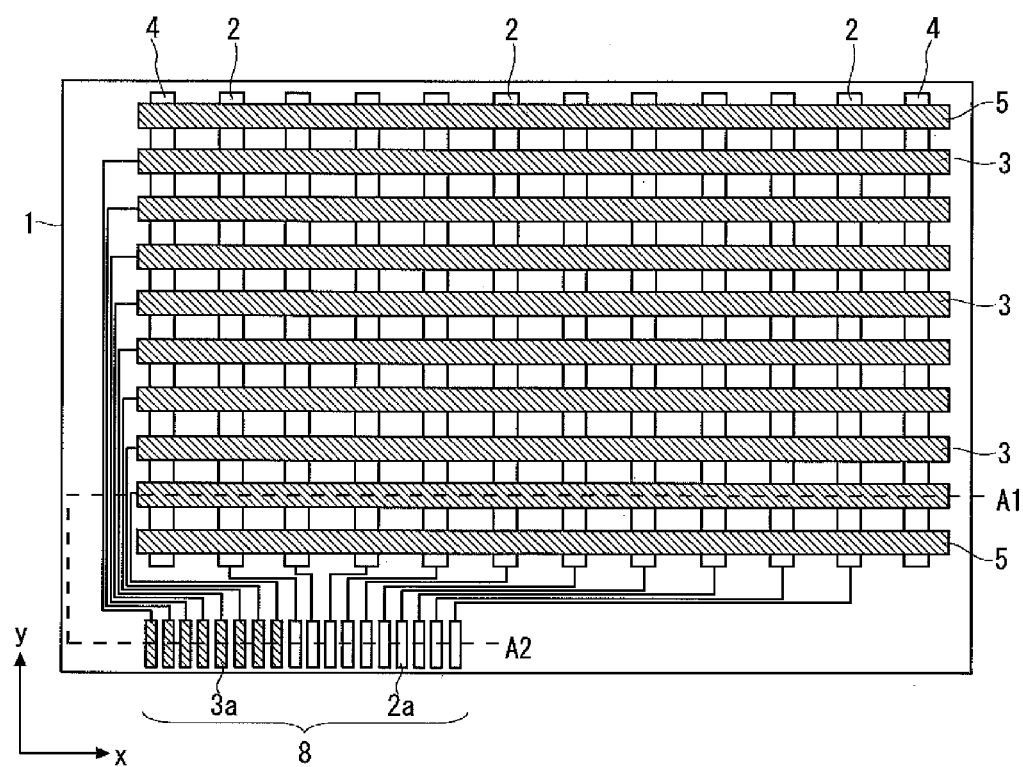

F I G . 2
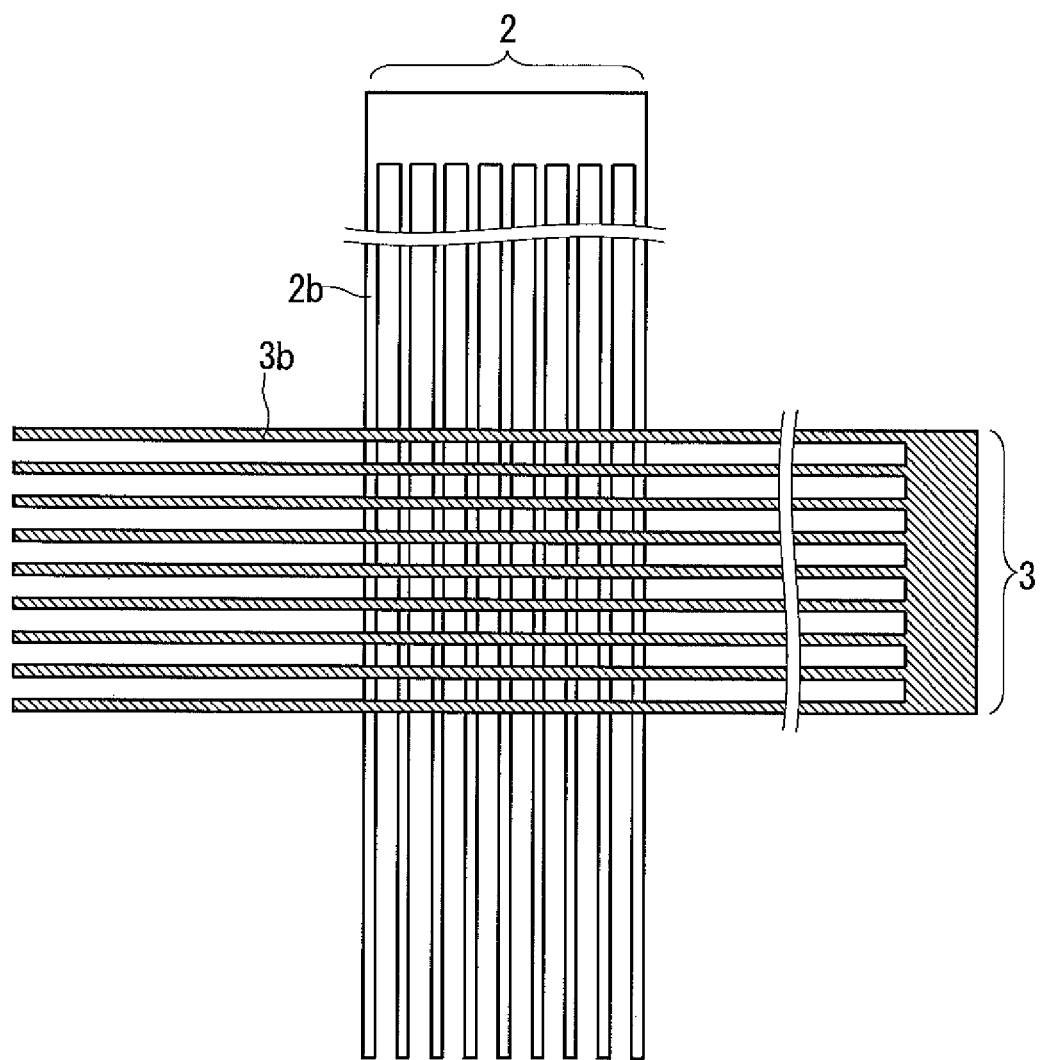

FIG. 7

F I G . 8
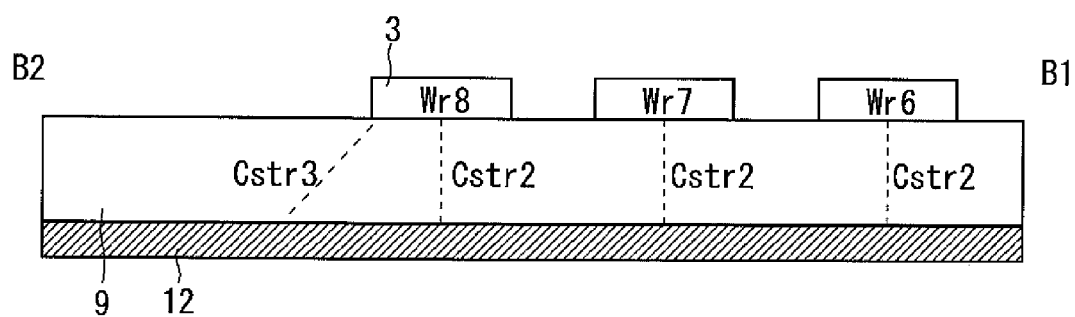

F I G . 1 4
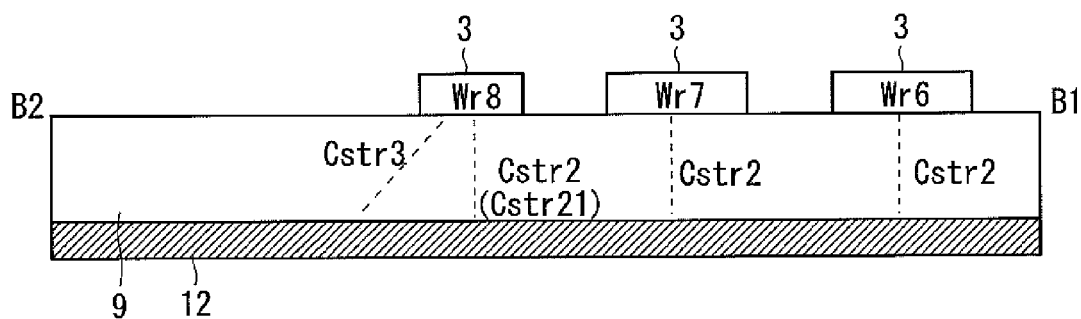

TOUCH PANEL AND DISPLAY DEVICE INCLUDING THE SAME

BACKGROUND OF THE INVENTION

1. Field of the Invention

The present invention relates to a touch panel and a display device including a touch panel.

2. Description of the Background Art

A touch panel that detects a touch of an indicator such as a finger and specifies positional coordinates of the touch is attracting attention as one of excellent user interface means. Touch panels according to various systems such as resistance film systems and electrostatic capacitance systems are commercialized.

As one of electrostatic capacitance systems, there is a PCT (Projected Capacitive Touchscreen) system that can perform touch detection even when a front surface side of a touch screen in which a touch sensor is incorporated is covered with a protection plate like a glass plate having a thickness of about a few millimeters (refer to Japanese Unexamined Patent Application Publication No. H09-511086 (1997), p. 7 line 19 to p. 8 line 4, p. 8 line 23 to p. 9 line 6, p. 13 lines 4 to 12, and see FIGS. 1, 2, and 8, for example). Because this system can have the protection plate arrayed on the front surface, the system has an advantage in that the system has excellent robustness, can detect a touch even when an operator is wearing gloves, and has a long life because there is no moving part.

For example, the touch screen of the touch panel using the PCT system described in Japanese Unexamined Patent Application Publication No. H09-511086 (1997) includes a first-series conductive material pattern (a conductor element) formed on a thin dielectric film and a second-series conductive material pattern (a conductor element) formed via an insulating film, as detection wirings for detecting electrostatic capacitances. Between the conductor elements, there is no electric contact, and a plurality of intersections are formed. Materials suited for conductive materials are metal materials such as silver, for example. Visibility becomes a problem in displaying. To reduce visibility, indium tin oxide (ITO) is used. A thin electric wire of 10 μm to 20 μm can be also used in place of a conductive material pattern.

A conductor element that detects electrostatic capacitances is connected to a capacitance control oscillator via an output line and a multiplexer. Outputs of the conductor element are counted by a divider, and are used as capacitance detection data.

In Japanese Patent Application Laid-Open Publication No. 2010-257178 (p. 5 lines 10 to 17, FIG. 4) described below, there is proposed a technique for providing a dummy drawing wiring at a further outer end of an outermost leading line, out of a plurality of leading lines that connect between a detection wiring and a terminal, on a touch screen of a touch panel. On the touch panel, a deviation between a parasitic capacitance of an outermost leading line and a parasitic capacitance of other leading line is suppressed, by applying a predetermined potential to the dummy drawing wiring. With this arrangement, a deviation of detection sensitivities of electrostatic capacitances of detection wirings can be reduced.

SUMMARY OF THE INVENTION

According to the touch panels of the electrostatic capacitance systems as described in Japanese Unexamined Patent Application Publication No. H09-511086 (1997) and in Japanese Patent Application Laid-Open Publication No. 2010-257178, a relaxation oscillator and a hysteresis oscillator can be used as a capacitance detecting circuit. An oscillation cycle of a capacitance detecting circuit is generally determined by a charge/discharge time constant of a resistor element and a capacitor element. Therefore, by using a part of the capacitance element as an electrostatic capacitance (hereinafter, "touch capacitance") that is formed between a detection wiring and an indicator, the oscillation cycle of the capacitance detecting circuit changes according to the touch capacitance. The touch panel of the electrostatic capacitance system determines presence of a touch and a touch position, by detecting a change of the oscillation cycle. To obtain satisfactory detection precision of a touch, a parasitic capacitance and a wiring resistance of a detection wiring need to be decreased as far as possible.

An area of an electrode formed on the touch panel by the user's finger touch is generally about one square centimeter and there is little difference, and a formed touch capacitance is about a few pF, although there is some difference depending on age and a body type of the user. Because there is a spread of an electric field in the touch capacitance, a position of a finger touch between detection wirings can be also detected by interpolating between adjacent detection wirings.

However, when an interval between detection wirings becomes larger than a finger width by a constant amount or more (specifically, the interval also depends on a distance between an electrode formed by a finger touch and a detection wiring (a thickness of a protection glass)), a change of an electrostatic capacitance by the finger touch does not appear in adjacent detection wirings. Therefore, position detection by the interpolation between the detection wirings becomes impossible. Consequently, when detection resolution of a touch position in the touch panel is set uniform, the interval between the adjacent detection wirings becomes constant.

In the case of using a touch panel in combination with a display panel of a liquid-crystal display device or the like, a general display panel does not have a square shape but has a vertically long or laterally long shape in many case. Therefore, usually, a shape of a detection region of the touch panel is also matched with the shape of the display panel. To obtain satisfactory detection precision of a touch, it is desirable that a parasitic capacitance formed between each detection wiring of the touch screen and the display panel is set as uniform as possible.

When a touch panel is combined with a display panel, there is a risk of reduction in detection precision of a touch, particularly in the detection wirings that are arrayed at peripheral portions of a touch screen, due to noise generated in the display panel. Although depending on a distance between the display panel and the detection wirings, parasitic capacitances increase due to sneak capacitance and the like at a periphery, on the detection wirings arrayed at peripheral portions of the touch panel. A difference occurs between these parasitic capacitances and parasitic capacitances of other detection wirings. When parasitic capacitances vary in detection wirings, there arises a problem in that detection sensitivities of the touch screen become non-uniform, and a normal touch detection cannot be performed at near an end portion of the touch panel.

A technique of Japanese Patent Application Laid-Open Publication No. 2010-257178 sets parasitic capacitances of drawing wirings uniform, but cannot suppress variations of parasitic capacitances of detection wirings, and does not solve the above problems.

An object of the present invention is to suppress variations of parasitic capacitances of detection wirings on a touch panel that includes a plurality of detection wirings.

A touch panel according to the present invention includes a touch screen that includes a plurality of detection wirings arrayed in parallel, and parasitic capacitance setting means that sets parasitic capacitances of an outermost detection wiring out of the plurality of detection wirings equal to parasitic capacitances of other detection wirings.

Because parasitic capacitances of a plurality of detection wirings are set uniform, variations of detection sensitivities of a touch on the touch screen can be suppressed. Accordingly, an effect of improvement of detection precision of a touch can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view showing a configuration of a touch screen of a touch panel according to a first preferred embodiment;

FIG. 2 is a partial plan view showing a configuration of detection column wirings and detection row wirings of the touch panel according to the first preferred embodiment;

FIG. 7 is a view showing a configuration of a detection oscillation circuit of a conventional touch panel;

FIG. 8 is an explanatory view of a parasitic capacitance added to detection row wirings of the conventional touch panel;

FIG. 14 is an explanatory view of a parasitic capacitance added to detection row wirings of the touch panel according to the second preferred embodiment.

DESCRIPTION OF THE PREFERRED EMBODIMENTS

First Preferred Embodiment

Figure 3:
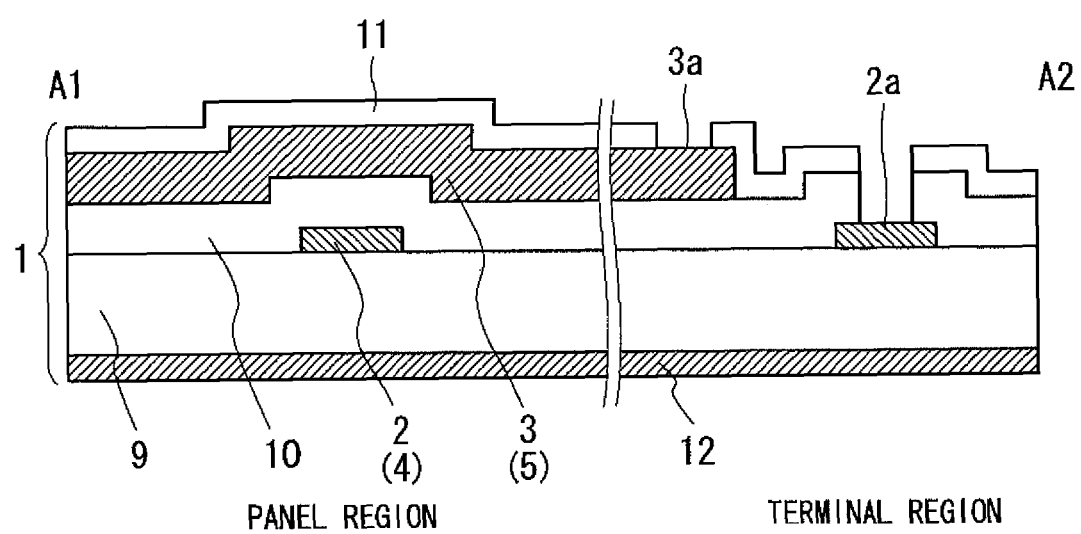
FIG. 3 is a cross-sectional view showing a cross-sectional configuration of the touch screen in the touch panel according to the first preferred embodiment.

FIG. 1 is a plan view schematically showing a configuration of a touch screen 1 of a touch panel according to the present invention. As shown in FIG. 1, the touch screen 1 includes a plurality of detection column wirings 2 that are extended to a column direction (a y direction shown in FIG. 1) and are arrayed in parallel at a predetermined pitch, and a plurality of detection row wirings 3 that are extended to a row direction (an x direction shown in FIG. 1) and are arrayed in parallel at a predetermined pitch. Further, near an end portion on the touch screen 1, there is arrayed a terminal group 8 that includes a plurality of terminals 2a connected to the detection column wirings 2 via leading lines, and a plurality of terminals 3a connected to the detection row wirings 3 via leading lines.

The touch panel detects a position of an indicator such as a finger of a user on the touch screen 1, by detecting an electrostatic capacitance (a touch capacitance) formed between the indicator and the detection column wiring 2 and the detection row wiring 3 when the indicator touches the touch screen 1, by using a detecting circuit (not shown in FIG. 1) connected to the terminal group 8.

FIG. 2 is a partially enlarged plan view of the detection column wirings 2 and the detection row wirings 3. The detection column wirings 2 and the detection row wirings 3 are wiring groups, each group including a bundle of a plurality of thin lines 2b, 3b, respectively. In other words, each group of the detection column wirings 2 and the detection row wirings 3 has a plurality of slit opening portions that are extended to a longitudinal direction.

When each of the detection column wirings 2 and the detection row wirings 3 is what is called a "solid wiring" that does not have an opening portion, for example, a touch capacitance formed by the indicator can be set large. However, when the touch screen 1 is arrayed on a front surface of the display panel, the detection column wirings 2 and the detection row wirings 3 interrupt transmission of a display beam. Therefore, this lowers brightness of a screen of the display panel. When the slit opening portions are formed on the detection column wirings 2 and the detection row wirings 3 as shown in FIG. 2, opening areas of the touch screen 1 becomes large, and therefore, reduction of brightness of the screen can be suppressed.

In the present preferred embodiment, it is assumed that the touch panel is arrayed on the front surface of the display panel such as a liquid-crystal display panel, and that the detection column wirings 2 and the detection row wirings 3 are wiring groups, each group including a bundle of the plurality of thin lines 2b, 3b, respectively. The touch panel according to the present invention can be combined with all kinds of display panels of display devices such as an organic EL (electroluminescence) display panel and a PDP (Plasma Display Panel), for example, without being limited to a liquid-crystal display panel.

More specifically, it is desirable that the detection column wirings 2 and the detection row wirings 3 are formed of a metal such as Cu and Al, for example, and that widths of the thin lines 2b, 3b are equal to or smaller than 20 μm to obtain satisfactory visibility of a display screen. Numbers, widths, and pitches of the thin lines 2b of the detection column wirings 2 and the thin lines 3b of the detection row wirings 3, respectively, and numbers, widths, and pitches of the detection column wirings 2 and the detection row wirings 3, respectively are suitably selected corresponding to resolutions that are required to detect a size of the touch screen 1 and a touch position (touch coordinates).

A light transmission rate of the touch screen 1 can be set high, even when the detection column wirings 2 and the detection row wirings 3 are formed of a transparent wiring material (a conductive material) such as ITO. However, because a sheet resistance value of ITO is relatively high, even when the detection column wirings 2 and the detection row wirings 3 of ITO are solid wirings, a resistance of ITO cannot be disregarded when a touch panel size becomes large, and therefore, a detection sensitivity of a touch capacitance becomes low. Accordingly, it is preferable that the detection column wirings 2 and the detection row wirings 3 have a structure made of the thin lines 2b, 3b of a metal.

On the touch screen 1 of the present preferred embodiment, there are arrayed dummy column wirings 4 of the same structure (the same shape and the same width) as that of the detection column wirings 2, such that the dummy column wirings 4 are adjacent in parallel to further outer sides of the outermost (both ends) detection column wirings 2, as shown in FIG. 1. Similarly, dummy row wirings 5 are arrayed such that the dummy row wirings 5 are adjacent in parallel to further outer sides of the outermost detection row wirings 3. Operation and effects of the dummy column wirings 4 and the dummy row wirings 5 are described later.

FIG. 3 is a view showing a cross-sectional structure of the touch screen 1, and shows a part of a cross section along line A1-A2 in FIG. 1. As shown in FIG. 3, the touch screen 1 has a transparent substrate 9 (hereinafter, "base substrate") made of transparent glass or resin, as a base material. The detection column wirings 2 are arrayed on the base substrate 9. A top of the detection column wirings 2 is covered with a transparent interlayer insulating film 10 such as a silicon oxide ($SiO_2$) film and a silicon nitride (SiN) film. The detection row wirings 3 are formed on the interlayer insulating film 10.

A top of the detection row wirings 3 is covered with a protection film 11 as a transparent insulation film similar to the interlayer insulating film 10. The leading lines and the terminals 2a that are connected to the detection column wirings 2 are formed by using the same wiring layer as that of the detection column wirings 2. The leading lines and the terminals 3a that are connected to the detection row wirings 3 are formed by using the same wiring layer as that of the detection row wirings 3. As shown in FIG. 3, contact holes to which upper surfaces of the terminals 2a, 3a are exposed are formed on the interlayer insulating film 10 and the protection film 11.

When the touch screen 1 is arrayed on the front surface of the display panel like in the present preferred embodiment, a transparent dielectric film 12 like ITO is formed on a lower surface of the base substrate 9, to prevent the touch screen 1 from receiving an influence of noise from the display panel. When the influence of noise from the display panel can be disregarded, the dielectric film 12 may be omitted.

Figure 4:
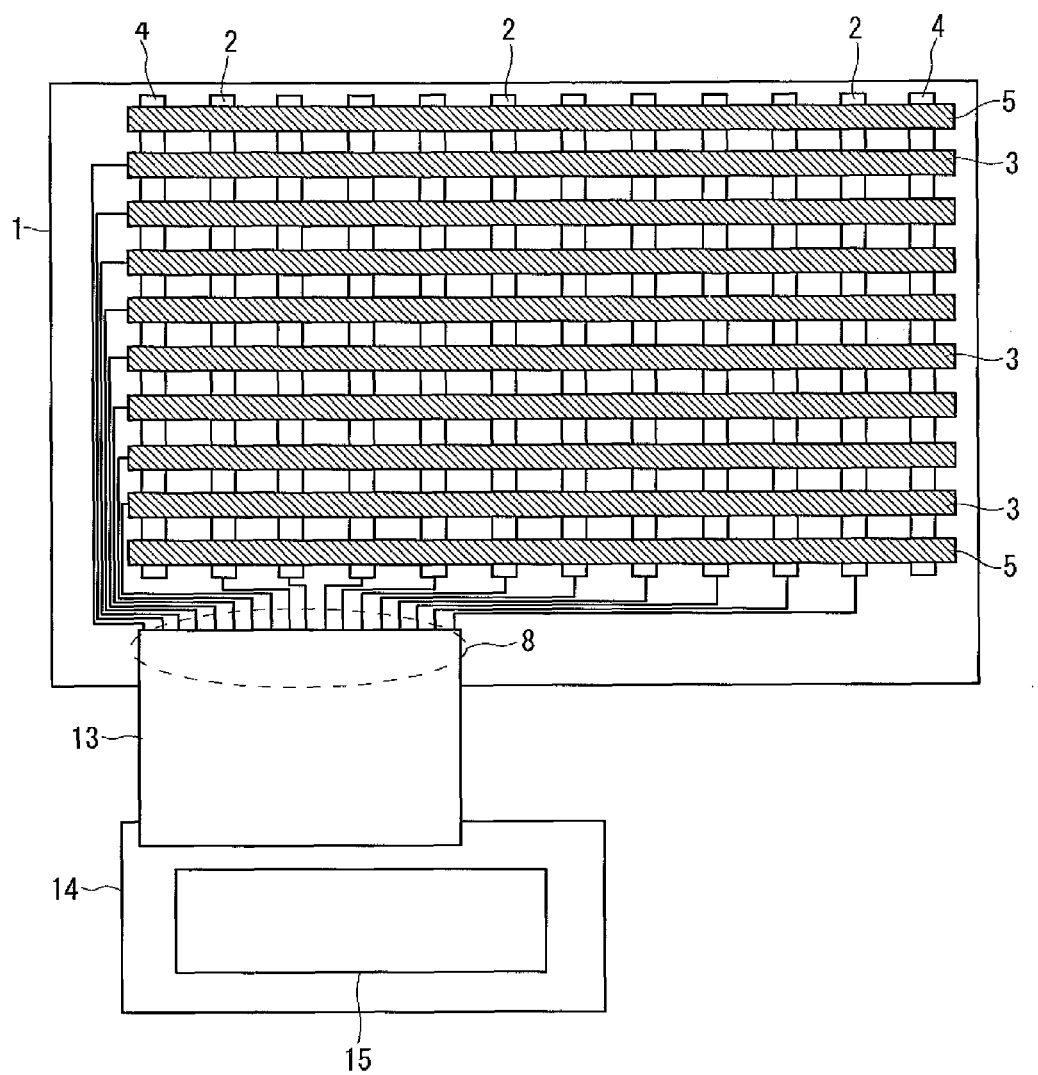
FIG. 4 is a view showing a total configuration of the touch panel according to the first preferred embodiment.

FIG. 4 is a view showing a total configuration of the touch panel according to a first preferred embodiment. FIG. 4 shows a state that a controller substrate 14 on which a detecting circuit 15 of a touch capacitance is mounted is connected to the touch screen 1. Each terminal of an FPC 13 (Flexible Printed Circuit) is mounted on the terminal group 8 of the touch screen 1, by using an ACF (Anisotropic Conductive Film) or the like. The terminal group 8 is connected to the detecting circuit 15 on the controller substrate 14 via the FPC 13.

The detecting circuit 15 is for detecting a touch capacitance formed between the indicator such as a finger and the detection column wiring 2 and the detection row wiring 3, detecting a touch by the indicator, and calculating touch coordinates. Touch coordinate data that are calculated by the detecting circuit 15 are inputted to an external computer (not shown) or the like.

Figure 5:
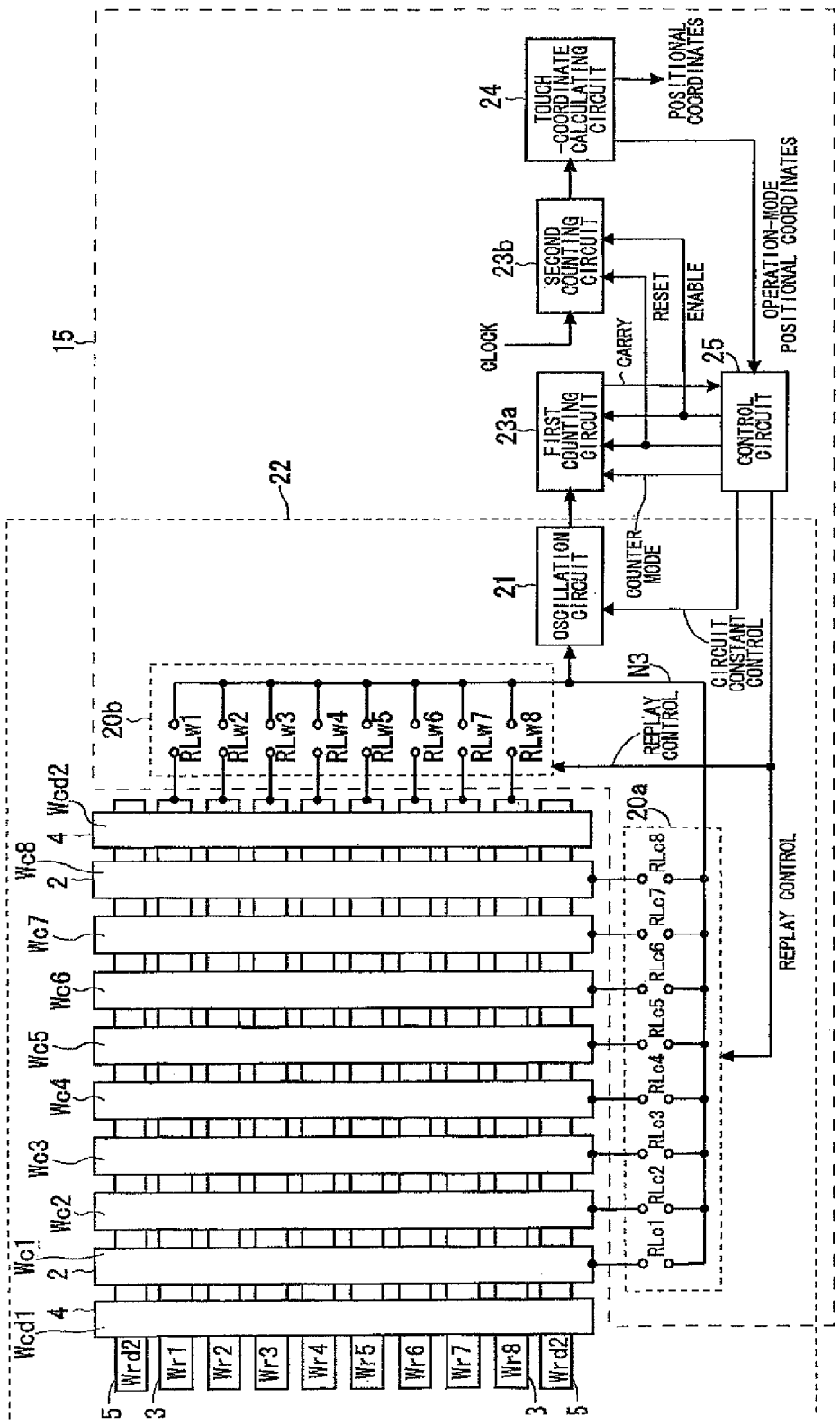
FIG. 5 is a view showing a configuration of a detecting circuit included in the touch panel according to the first preferred embodiment.

FIG. 5 is a view showing a configuration of the detecting circuit 15 included in the touch panel according to the present preferred embodiment. In this case, FIG. 5 shows an example that the touch panel includes eight series (eight) of the detection column wirings 2 and the detection row wirings 3, respectively. That is, the touch panel includes detection column wirings Wc1 to Wc8 as the detection column wirings 2, and includes detection row wirings Wr1 to Wr8 as the detection row wirings 3. Further, the touch panel includes a dummy column wiring Wcd1 that is arrayed at an outer side of the detection column wiring Wc1, and a dummy column wiring Wcd2 that is arrayed at an outer side of the detection column wiring Wc8, as the dummy column wirings 4, and includes a dummy row wiring Wrd1 that is arrayed at an outer side of the detection row wiring Wr1, and a dummy row wiring Wrd2 that is arrayed at an outer side of the detection row wiring Wr8, as the dummy row wirings 5.

The detecting circuit 15 is configured by a column-wiring selection switch circuit 20a, a row-wiring selection switch circuit 20b, an oscillation circuit 21, a first counting circuit 23a, a second counting circuit 23b, a touch-coordinate calculating circuit 24, and a control circuit 25.

The column-wiring selection switch circuit 20a includes at one end switches RLc1 to RLc8 that are connected to the detection column wirings Wc1 to Wc8, respectively, and the row-wiring selection switch circuit 20b includes at one end switches RLw1 to RLw8 that are connected to the detection row wirings Wr1 to Wr8, respectively.

The other ends of the switches RLc1 to RLc8 and the switches RLw1 to RLw8 are all connected to a node N3 as an input terminal of the oscillation circuit 21. The column-wiring selection switch circuit 20a (the switches RLc1 to RLc8) and the row-wiring selection switch circuit 20b (the switches RLw1 to RLw8) change over the detection column wirings 2 and the detection row wirings 3 to be connected to the oscillation circuit 21, by each predetermined number in a predetermined order, and scan, following an instruction (a REPLAY control) from the control circuit 25.

Oscillation signals that are outputted from the oscillation circuit 21 are inputted to a counting unit which includes the first counting circuit 23a and the second counting circuit 23b. Upon receiving a reset signal from the control circuit 25, the first counting circuit 23a resets a count value. Upon receiving a subsequent enable signal, the first counting circuit 23a counts the oscillation signals from the oscillation circuit 21 until when the count value reaches a predetermined value. The second counting circuit 23b resets the count value upon receiving a reset signal. Upon receiving an enable signal, the second counting circuit 23b counts clock signals until when the count value of the first counting circuit 23a becomes the above predetermined value.

That is, the second counting circuit 23b counts time from when the first counting circuit 23a starts counting oscillation signals of the oscillation circuit 21 until when the count value reaches the predetermined value. Therefore, the count value of the second counting circuit 23b is proportional to a cycle of oscillation signals of the oscillation circuit 21, and an oscillation cycle of the oscillation circuit 21 is known from a count value of the second counting circuit 23b.

The count value (corresponding to the oscillation cycle of the oscillation circuit 21) of the second counting circuit 23b is inputted to the touch-coordinate calculating circuit 24. As described later, the oscillation cycle of the oscillation circuit 21 is generally determined by a charge/discharge time constant decided by a resistance and a capacitance connected to the node N3. Because the detection column wirings Wc1 to Wc8 and the detection row wirings Wr1 to Wr8 are sequentially connected to the node N3 via the column-wiring selection switch circuit 20a and the row-wiring selection switch circuit 20b, when the indicator such as a finger touches the touch screen 1 and when a touch capacitance is formed between any one of the detection column wirings Wc1 to Wc8 and any one of the detection row wirings Wr1 to Wr8, the oscillation cycle of the oscillation circuit 21 changes at a timing corresponding to this position.

The touch-coordinate calculating circuit 24 holds the oscillation cycle of the oscillation circuit 21 obtained from a coefficient value of the second counting circuit 23b, in an inside storage unit. The touch-coordinate calculating circuit 24 detects a change of the oscillation cycle at a last scanning time of the detection column wirings Wc1 to Wc8 and the detection row wirings Wr1 to Wr8, and a change of the oscillation cycle within a scanning of the same scanning time, and calculates positional coordinates (touch coordinates) of the indicator based on the detection.

In this way, in the touch panel according to the present preferred embodiment, the detection column wirings 2 (Wc1 to Wc8) and the detection row wirings 3 (Wr1 to Wr8), the column-wiring selection switch circuit 20a, the row-wiring selection switch circuit 20b, and the oscillation circuit 21 constitute a detection oscillation circuit 22 that generates an oscillation signal corresponding to touch coordinates. The touch-coordinate calculating circuit 24 calculates touch coordinates based on the oscillation cycle of the detection oscillation circuit 22.

Figure 6:
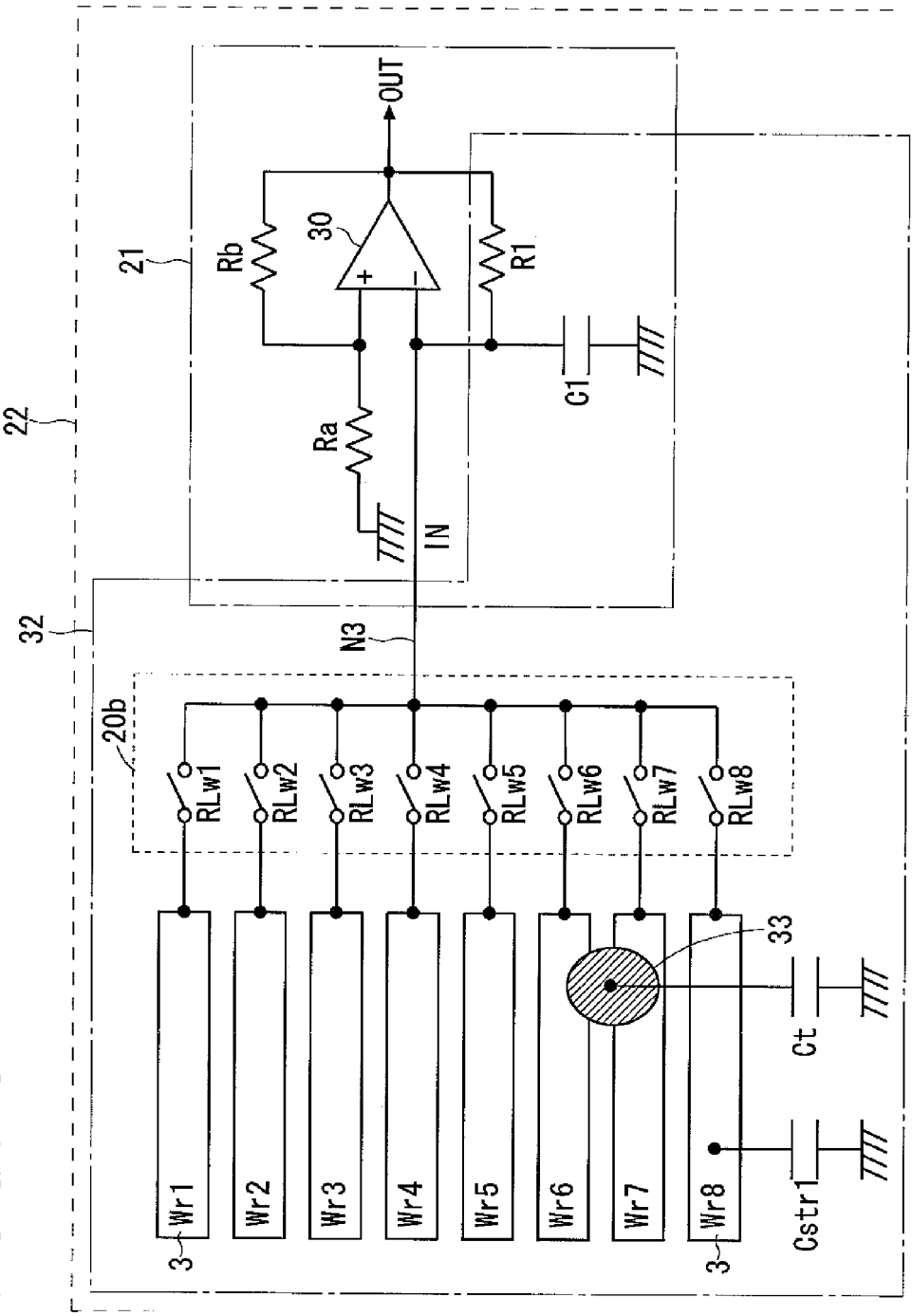
FIG. 6 is a view showing a configuration of an oscillation circuit included in a detection oscillation circuit of the touch panel according to the first embodiment.

The oscillation cycle of the detection oscillation circuit 22 is described. FIG. 6 is a view showing a configuration of the oscillation circuit 21 included in the detection oscillation circuit 22. An operation principle of the detection oscillation circuit 22 is described below with reference to FIG. 6.

To simplify the description, the detection oscillation circuit 22 is assumed to be configured by the detection row wirings 3 (Wr1 to Wr8), the row-wiring selection switch circuit 20b, and the oscillation circuit 21. The description is performed by omitting the detection column wirings 2 and the column-wiring selection switch circuit 20a. The dummy column wirings 4 (Wcd1, Wcd2) and the dummy row wirings 5 (Wrd1, Wrd2) are also omitted from FIG. 6.

The oscillation circuit 21 is configured by using an operation amplifier 30. A resistor element Ra is connected between a non-inverting input terminal of the operation amplifier 30 and a ground. A resistor element Rb is connected between the non-inverting input terminal of the operation amplifier 30 and an output terminal. A capacitor element C1 is connected between the non-inverting input terminal of the operation amplifier 30 and the ground. A resistor element R1 is connected between the non-inverting input terminal of the operation amplifier 30 and an output terminal.

The oscillation circuit 21 shown in FIG. 6 is what is called a relaxation oscillation circuit. The oscillation circuit 21 oscillates based on a charge/discharge performed by a feedback circuit 32 (hereinafter, "detection feedback path") which is configured by electrostatic capacitances of the detection row wirings Wr1 to Wr8 and a touch capacitor Ct in addition to the resistor element R1 and the capacitor element C1, from positive and negative output saturation voltages. Oscillation signals are outputted from the output terminal of the operation amplifier 30.

An oscillation cycle Tc of the oscillation circuit 21 as a single unit that does not include the detection row wirings 3 and the row-wiring selection switch circuit 20b becomes generally as shown by Equation (1) below, and is proportional to a time constant τ of a feedback path which includes the resistor element R1 and the capacitor element C1.

$$Tc = 2\tau \cdot \ln((1+k)/(1-k)) \quad (1)$$

In Equation (1), $\tau = R1 \cdot C1$, and $k = Ra/(Ra+Rb)$. Further, R1, C1, Ra, Rb that are used in Equation (1) designate resistance values of resistor elements and an electrostatic capacitance value of a capacitor element.

Therefore, in the detection oscillation circuit 22 that also includes the detection row wirings 3 and the row-wiring selection switch circuit 20b, when the touch capacitor Ct is formed near an indicator 33 such as a finger and any one of the detection row wirings Wr1 to Wr8 by a touch of the indicator, a time constant τ increases due to the detection feedback path 32, and the oscillation cycle of the detection oscillation circuit 22 becomes large. As described earlier, in the touch panel according to the present preferred embodiment, touch coordinates are detected by detecting a change of the oscillation cycle of the detection oscillation circuit 22, by using the first counting circuit 23a and the second counting circuit 23b shown in FIG. 5.

However, as described later, because resistor components of the detection row wirings Wr1 to Wr8 enter in series with the touch capacitor Ct, when resistance values of the detection row wirings Wr1 to Wr8 are large, a degree of increase in the oscillation cycle due to occurrence of the touch capacitor Ct becomes small, and detection sensitivity of the touch capacitor Ct becomes low. Further, a parasitic capacitance is added between the detection column wirings 2 (not shown in FIG. 6) and the display panel, in each of the detection row wirings Wr1 to Wr8. A detection sensitivity of the touch capacitor Ct also becomes low when the parasitic capacitance is large.

In the above calculation of the oscillation cycle, to simplify the description, parasitic capacitances following the detection column wirings 2, the detection row wirings 3, the leading lines that connect between these wirings and the terminal group 8, and other wirings, and electrostatic capacitances observed from input/output terminals of the column-wiring selection switch circuit 20a and the row-wiring selection switch circuit 20b (that is, electrostatic capacitances inside the column-wiring selection switch circuit 20a and the row-wiring selection switch circuit 20b) are not taken into account. Actually, it is necessary to select parameters of each circuit such as a resistance value, after taking these electrostatic capacitances into account. However, because these electrostatic capacitances do not affect the essence of the present preferred embodiment, the description is performed by omitting these electrostatic capacitances.

Figure 7:
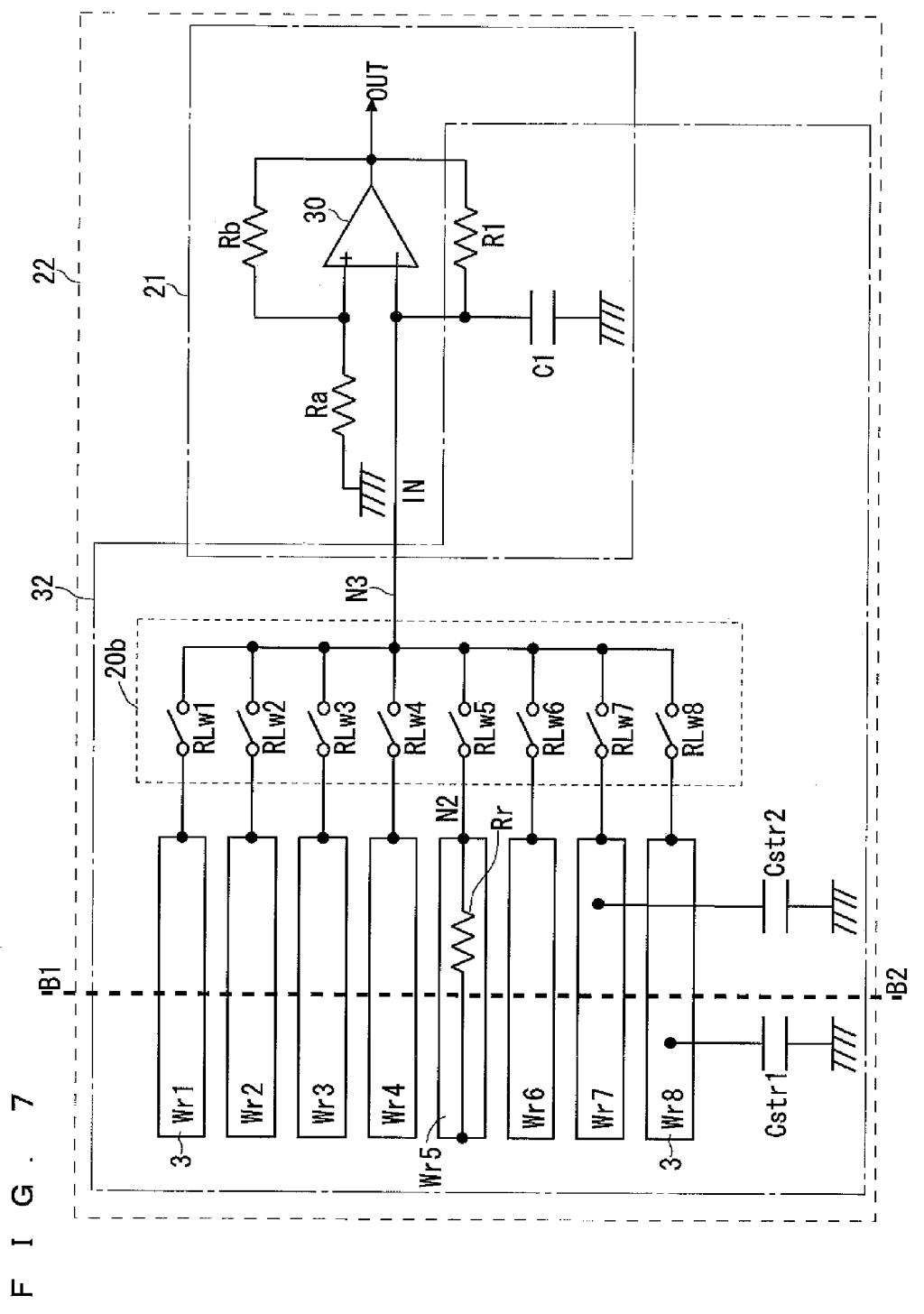

A parasitic capacitance that is added to the detection row wirings 3 or the detection column wirings 2 (not shown) of the touch screen 1 is described. FIG. 7 shows a configuration of the detection oscillation circuit 22 included in a conventional touch panel. Although the conventional detection oscillation circuit 22 also actually has the detection column wirings 2 and the column-wiring selection switch circuit 20a, the detection column wirings 2 and the row-wiring selection switch circuit 20b are omitted from the drawing, to simplify the description. The conventional touch panel does not have the dummy column wirings 4 (Wcd1, Wcd2) and the dummy row wirings 5 (Wrd1, Wrd2), and it does not mean that these dummy column wirings and dummy row wirings are omitted from FIG. 7. It is desirable that wiring resistance values (Rr) of the detection row wirings 3 are all equal, and similarly it is desirable that the wiring resistance values of the detection column wirings 2 (not shown) are all equal.

FIG. 8 is a view showing a part of a cross section along line B1-B2 in FIG. 7, and corresponds to a portion near three detection row wirings (Wr6 to Wr8) at an end out of eight detection row wirings Wr1 to Wr8. The transparent dielectric film 12 like ITO is formed on a lower surface of the base substrate 9, to prevent the touch panel from receiving an influence of noise from the display panel.

As shown in FIG. 8, a parasitic capacitance Cstr2 formed between each of the detection row wirings Wr1 to Wr8 and the dielectric film 12 below these wirings is added to each detection row wiring. In addition to the parasitic capacitance Cstr2, a parasitic capacitance Cstr3 is added to each of the detection row wirings Wr1, Wr8 that are arrayed at both ends, due to the influence of sneak capacitance at a periphery. Therefore, a parasitic capacitance Cstr1 (FIG. 7) that is added to the detection row wirings Wr1, Wr8 at both ends becomes Cstr2+Cstr3, and the parasitic capacitance of other detection row wirings Wr2 to Wr7 becomes Cstr2. As a result, a difference occurs between these parasitic capacitances.

In this case, there arises a difference between a detection sensitivity of a touch at a position near the detection row wirings Wr1, Wr8 at both ends and a detection sensitivity of a touch at a position near the detection row wirings Wr2 to Wr7. As a result, detection precision of a touch capacitance on the touch screen 1 is aggravated. Even when the dielectric film 12 is not formed on the lower surface of the base substrate 9, there arises a difference between the parasitic capacitance of the detection row wirings Wr1, Wr8 at both ends and the parasitic capacitance of the other detection row wirings Wr2 to Wr7, by receiving an influence of the display panel and the like.

Figure 9:
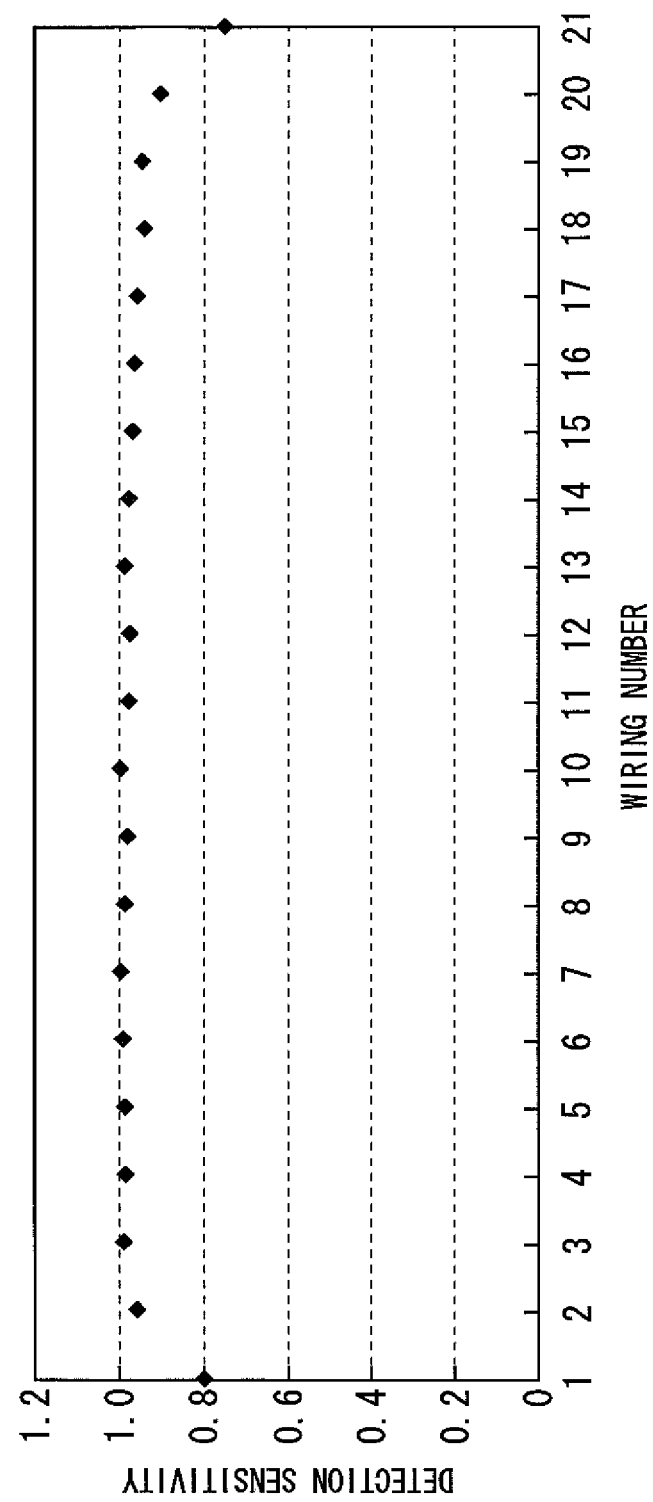
FIG. 9 is a view showing a distribution of detection sensitivities of detection row wirings of the conventional touch panel.

FIG. 9 is a view showing an example of measurement values of touch detection sensitivities of the detection row wirings 3 on the conventional touch panel (having no dummy row wirings 5) that has 21 detection row wirings 3. In FIG. 9, an X axis represents row numbers of the detection row wirings 3, and a Y axis represents detection sensitivities (normalized by setting a highest value as 1). It is understood from FIG. 9 that detection sensitivities of the detection row wirings 3 at both ends (a first row and a twenty-first row) are lower than other detection sensitivities.

A main reason for this is considered that, as described above, the parasitic capacitances of the detection row wirings 3 at both ends are higher than the parasitic capacitances of the other detection row wirings 3. Therefore, to equalize the detection sensitivities of all the detection row wirings 3, it is valid to equalize the parasitic capacitances of all the detection row wirings 3.

Figure 10:
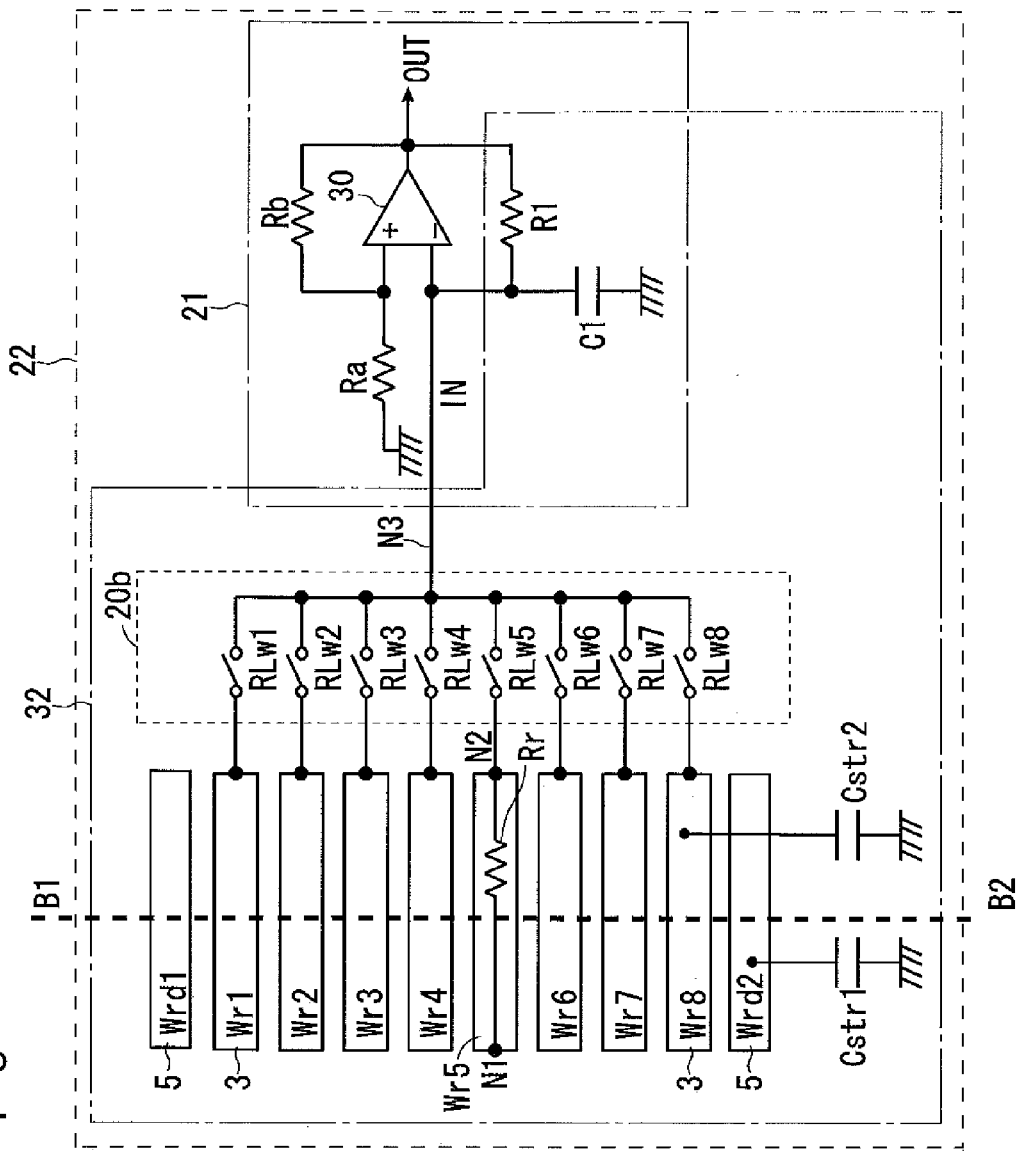
FIG. 10 is a view showing a configuration of a detection oscillation circuit of the touch panel according to the first preferred embodiment.

FIG. 10 is a view showing a configuration of the detection oscillation circuit 22 included in the touch panel according to the first preferred embodiment. In the detection oscillation circuit 22, the dummy row wirings Wrd1, Wrd2 of a configuration similar (a shape and a width are the same) to that of the detection row wirings Wr1 to Wr8 are arrayed at further outer sides of the detection row wirings Wr1, Wr8 that are arrayed at both ends, out of the detection row wirings 3 (Wr1 to Wr8), at an interval similar to the interval of the detection row wirings Wr1 to Wr8.

The detection oscillation circuit 22 according to the present preferred embodiment actually also has the detection column wirings 2 (Wc1 to Wc8) and the column-wiring selection switch circuit 20a, as shown in FIG. 5. Further, the dummy column wirings 4 (Wcd1, Wcd2) of a configuration similar to that of the detection column wirings 2 are arrayed at further outer sides of the detection column wirings 2 (Wc1, Wc8) at both ends, at an interval similar to the interval of the detection column wirings Wc1 to Wc8. However, these detection column wirings are omitted from the drawing to simplify the description. It is desirable that the wiring resistance values (Rr) of the detection row wirings 3 are all equal, and this is similarly applied to the detection column wirings 2 (not shown).

Figure 11:
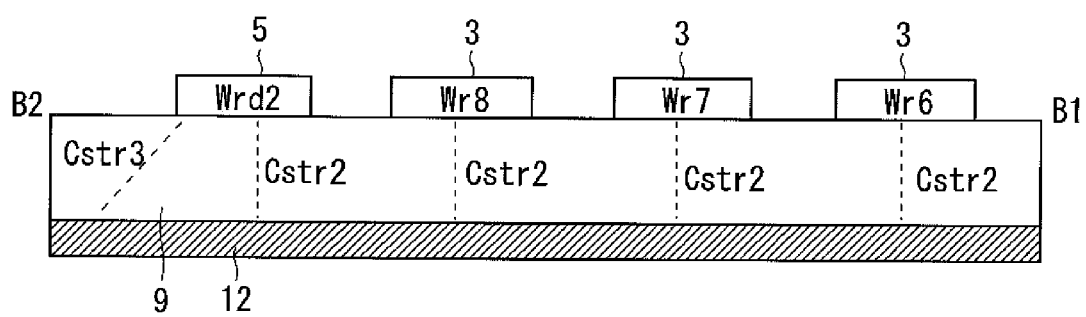
FIG. 11 is an explanatory view of a parasitic capacitance added to detection row wirings of the touch panel according to the first preferred embodiment.

FIG. 11 is a view showing a part of a cross section along line B1-B2 in FIG. 10, and corresponds to three detection row wirings (Wr6 to Wr8) at an end out of eight detection row wirings Wr1 to Wr8, and a portion near the dummy row wiring Wrd2 arrayed at an outer side of the three detection row wirings. The transparent dielectric film 12 like ITO is also formed on a lower surface of the base substrate 9, to prevent the touch panel from receiving an influence of noise from the display panel.

As shown in FIG. 11, the parasitic capacitance Cstr2 formed between each of the detection row wirings Wr1 to Wr8 and the dielectric film 12 below these wirings is added to each detection row wiring. Unlike in the conventional structure (FIG. 8), the parasitic capacitance Cstr3 due to the influence of sneak capacitance at a periphery is not added to the detection row wirings Wr1, Wr8. On the other hand, the parasitic capacitance Cstr3 due to the influence of sneak capacitance at a periphery is added, in addition to the parasitic capacitance Cstr2, to the dummy row wirings Wrd1, Wrd2 arrayed at outer sides of the detection row wirings Wr1, Wr8, like the detection row wirings Wr1, Wr8 in the conventional structure (FIG. 8).

In this way, the detection row wirings Wr1, Wr8 are set in an environment substantially similar to that of the other detection row wirings Wr2 to Wr7, by arraying the dummy row wirings Wrd1, Wrd2 at further outer sides of the detection row wirings Wr1, Wr8 at both ends. Therefore, the parasitic capacitance Cstr3 due to the influence of sneak capacitance at a periphery is not added to the detection row wirings Wr1, Wr8. As a result, the parasitic capacitances of all the detection row wirings Wr1 to Wr8 become uniform. Consequently, variations of detection sensitivities of touch capacitances in a column direction are suppressed, and an effect of improvement of detection precision of a touch is obtained.

The dummy column wirings 4 (Wcd1, Wcd2) arrayed at outer sides of the detection column wirings 2 (Wc1 to Wc8) also have an effect similar to the above effect, although the description of this is omitted here. That is, by arraying the dummy column wirings 4 (Wcd1, Wcd2) at further outer sides of the detection column wirings 2 (Wc1, Wc8) at both ends, parasitic capacitances due to the influence of sneak capacitance at a periphery are not added to the detection column wirings 2 (Wc1, Wc8) at both ends. As a result, parasitic capacitances become uniform for all the detection column wirings 2. Consequently, variations of detection sensitivities of touch capacitances in a row direction can be suppressed, and detection precision of the touch capacitances improves.

Figure 12:
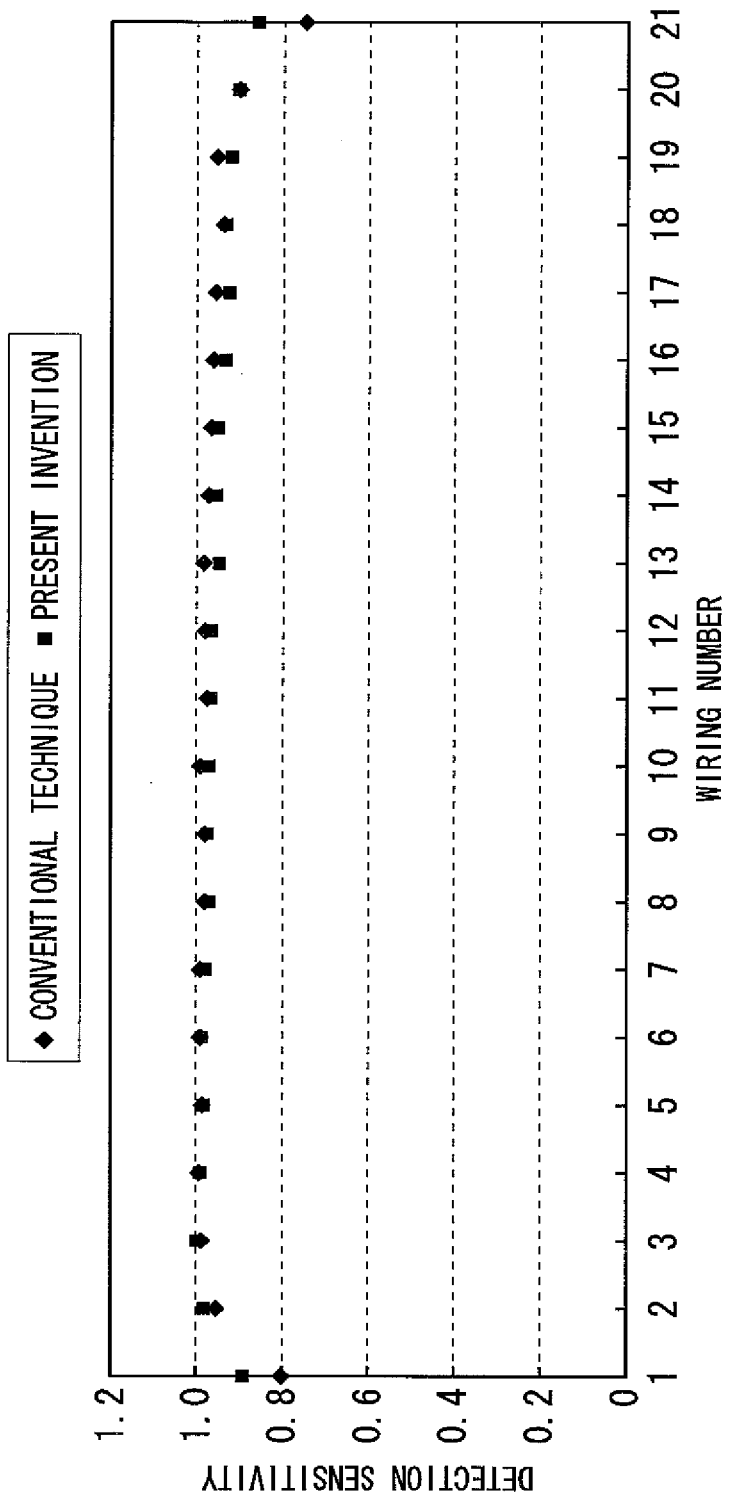
FIG. 12 is a view showing a distribution of detection sensitivities of detection row wirings of the touch panel according to the first preferred embodiment.

FIG. 12 is a view showing an example of measurement values of touch detection sensitivities of the detection row wirings 3 on the touch panel that has 21 detection row wirings 3 according to the present invention. In FIG. 12, the measurement values according to a conventional technique shown in FIG. 9 are also plotted for comparison. As shown in FIG. 12, in the present invention, detection sensitivities of the detection row wirings 3 at both ends (a first row and a twenty-first row) are higher than those according to the conventional technique, and are values near values of other detection sensitivities. A reason for this is that the parasitic capacitances of the detection row wirings 3 at both ends are not easily affected by sneak capacitance at a periphery and become values near values of the parasitic capacitances of the other detection row wirings 3.

In the present preferred embodiment, although the dummy row wirings 5 are arrayed at both outer sides of the detection row wirings 3, the dummy row wiring 5 may be arranged to be arrayed at only one outer side. In this case, the above effect is obtained in the detection row wiring 3 at a side where the dummy row wiring 5 is arrayed. This is also similarly applied to the dummy column wirings 4 that are arrayed at outer sides of the detection column wirings 2.

In the present preferred embodiment, although one dummy row wiring 5 is arrayed at each outer side of the detection row wirings 3, the plurality of dummy row wirings 5 may be arranged to be arrayed at each outer side of the detection row wirings 3. With this arrangement, an effect of preventing the detection row wirings 3 from receiving an influence of sneak capacitance at a periphery further improves. This is also similarly applied to the dummy column wirings 4 that are arrayed at outer sides of the detection column wirings 2.

A structure (a shape and a width) of the dummy row wiring 5 is preferably the same as a structure of each of the detection row wirings 3. An interval between the dummy row wiring 5 and an outermost detection row wiring 3 is preferably the same as an interval between the detection row wirings 3. With this arrangement, the outermost detection row wirings 3 and the other detection row wirings 3 are set in a more equal environment, and the parasitic capacitances of the detection row wirings 3 become more uniform. When the detection row wirings 3 include the plurality of thin lines 3b as shown in FIG. 2, for example, the dummy row wirings 5 are also preferably in a similar configuration. However, a structure and an interval of the dummy row wirings 5 are not limited to the above, and may be a structure and an interval that are different from those of the detection row wirings 3, within a range in which the effect of the present invention is obtained.

Also, for the dummy column wirings 4, a structure is preferably the same as that of the detection column wirings 2, and an interval between the dummy column wiring 4 and an outermost detection column wiring 2 is the same as the interval between the detection column wirings 2. However, a structure and an interval of the dummy row wirings 4 are not limited to the above, and may be a structure and an interval that are different from those of the detection row wirings 2, within a range in which the effect of the present invention is obtained.

A method for manufacturing a touch panel according to the present preferred embodiment is described next with reference to FIG. 3. First, on the base substrate 9 made of glass, a metal having aluminum as a main component, such as an Al alloy including Ni, AlNiNd, for example, is formed by a sputtering method, as a first conductive thin film that becomes the detection column wirings 2, the dummy column wirings 4, the terminals 2a, and the leading lines of the terminals. A film-forming condition to be applied is that a pressure is 0.2 Pa to 0.5 Pa, DC power is 1.0 kW to 2.5 kW, that is, 0.17 W/cm$^2$ to 0.43 W/cm$^2$ as power density, and a film-forming temperature is within a range from a room temperature to about 180° C. The first conductive thin film is formed in a thickness of 150 nm to 500 nm.

To suppress a reaction with a developing solution, a nitrided AlNiNdN layer may be formed on an AlNiNd layer of the first conductive thin film. AlNiSi or AlNiMg may be used instead of the AlNiNd. Alternatively, the first conductive thin film may be made of the same material as that of a second conductive thin film that becomes the detection row wirings 3, the dummy row wirings 5, the terminals 3a, and the leading lines of the terminals, that are formed afterward. With this arrangement, production efficiency improves. Cu or a Cu alloy other than Al can be also used as a low-resistance metal material. In this case, the film can be also formed by the sputtering method in a similar manner to that of Al.

Next, a resist that has shapes of the detection column wirings 2, the dummy column wirings 4, the terminals 2a, and the leading lines of the terminals is formed on the first conductive thin film, by a photolithography technique. Next, by using the resist as a mask, the detection column wirings 2, the dummy column wirings 4, the terminals 2a, and the leading lines are formed, by patterning the first conductive thin film, by etching using a mixed acid of phosphoric acid, nitric acid, and acetic acid, for example. When a cross-sectional shape of the detection column wirings 2, the dummy column wirings 4, the terminals 2a, and the leading lines of the terminals is formed in a tapered shape, coverage of the interlayer insulating film 10 that is formed on these items improves. With this arrangement, a defect such as a disconnection of an upper wiring layer can be prevented. Although etching using a mixed acid of phosphoric acid, nitric acid, and acetic acid is used above, a kind of an etching solution is not limited to this. Dry etching may be also used.

Next, the interlayer insulating film 10 is formed to cover the detection column wirings 2, the dummy column wirings 4, the terminals 2a, and the leading lines of the terminals, by a method like plasma CVD. A silicon oxide ($SiO_2$) film of a low dielectric rate is used as the interlayer insulating film 10. A film-forming condition of the silicon oxide film used is that a flow rate of $SiH_4$ is 10 sccm to 50 sccm, a flow rate of $N_2O$ is 200 sccm to 500 sccm, a film-forming pressure is 50 Pa, RF power is 50 W to 200 W, that is, 0.015 W/cm$^2$ to 0.67 W/cm$^2$, and a film-forming temperature is 200° C. to 300° C.

It is desirable that a film thickness of the interlayer insulating film 10 is as large as possible, to reduce parasitic capacitances that are formed between the detection column wirings 2 and the detection row wirings 3. The film thickness may be determined by taking production efficiency into account. The interlayer insulating film 10 is not limited to a $SiO_2$ film, and may be a SiN film or a SiON film. In this case, the interlayer insulating film 10 is formed by adding hydrogen, nitrogen, and $NH_3$ to a material gas of a $SiO_2$ film.

After the interlayer insulating film 10 is formed, as the second conductive thin film that becomes the detection row wirings 3, the dummy row wirings 5, the terminals 3a, and the leading lines of the terminals, there is formed a metal having aluminum as a main component, such as an Al alloy including Ni, AlNiNd, for example, by the sputtering method. A film-forming condition is that a pressure is 0.2 Pa to 0.5 Pa, DC power is 1.0 kW to 2.5 kW, that is, 0.17 W/cm$^2$ to 0.43 W/cm$^2$ as power density, and a film-forming temperature is within a range from a room temperature to about 180° C. The second conductive thin film is formed in a thickness of 200 nm to 1000 nm.

To suppress a reaction with a developing solution, a nitrided AlNiNdN layer may be formed on AlNiNd of the second conductive thin film. AlNiSi, AlNiMg or the like may be used instead of the AlNiNd. Cu or a Cu alloy other than Al can be also used as a low-resistance metal material. In this case, the film can be also formed by the sputtering method in a similar manner to that of Al.

It is desirable that a film thickness of the second conductive thin film is as large as possible. However, a loss amount and size variations of CD (Critical Dimension) that occur in a subsequent etching process tend to become larger when a film thickness of the second conductive thin film becomes larger. When the film thickness is large, productivity is also aggravated. Therefore, the thickness of the second conductive thin film is set at a proper film thickness within a range in which variations of detection sensitivities of a touch can be suppressed as far as possible.

Next, there is formed a resist that has shapes of the detection row wirings 3, the dummy row wirings 5, the terminals 3a, and the leading lines of the terminals, by the photolithography technique. Next, by using the resist as a mask, the detection row wirings 3, the dummy row wirings 5, the terminals 3a, and the leading lines of the terminals are formed, by patterning the second conductive thin film, by etching using a mixed acid of phosphoric acid, nitric acid, and acetic acid, for example. A kind of an etching solution that is used in this etching process is not limited to a mixed acid of phosphoric acid, nitric acid, and acetic acid. Dry etching may be also used.

Next, the protection film 11 is formed to protect the touch panel. For the protection film 11, the same kind of a film as that of the interlayer insulating film 10 is sufficient to obtain satisfactory visibility of the screen of the display panel. For example, when the interlayer insulating film 10 is a silicon oxide ($SiO_2$) film, the protection film 11 is formed by the $SiO_2$ film. A film thickness of the protection film 11 may be determined by taking coverage and productivity into account.

Next, by the photolithography technique, a resist that has upper portions of the terminals 2a, 2a opened is formed, and the protection film 11 and the interlayer insulating film 10 are patterned by etching together, by etching using a plasma of a mixed gas of $CF_4$ and $O_2$, for example. With this arrangement, contact holes for exposing upper surfaces of the terminals 2a, 2b are formed.

When the touch panel is used in combination with the display panel, the transparent dielectric film 12 for suppressing reduction of detection precision of a touch due to noise from the display panel is formed on a lower surface of the base substrate 9, according to a need. As the dielectric film 12, it is preferable to form the film by indium tin oxide (ITO), to prevent reduction of visibility of the display panel, but a film formation is not limited to this method. A thickness of the dielectric film 12 may be determined by taking productivity into account.

In the above process, the touch screen 1 of the configuration shown in FIG. 3 is formed. After this, the touch panel can be obtained by connecting the controller substrate 14 including the detecting circuit 15 to the touch screen 1 via the FPC 13. Further, the display device is assembled by arraying the touch screen 1 of the touch panel on the front surface of the display panel.

At the time of arraying the touch panel on the front surface of the display device, a holding mechanism of the touch screen 1 that is conventionally necessary can be eliminated, by directly adhering the touch screen 1 to the display panel, and the device as a whole can be made thin. Further, the touch screen 1 and the display panel are integrated. Therefore, mixing of dusts into a gap between the touch screen 1 and the display panel in a subsequent process can be prevented, and reduction of visibility of the display panel can be prevented.

Second Preferred Embodiment

In the first preferred embodiment, addition of the parasitic capacitance Cstr3 due to the influence of sneak capacitance at a periphery to the detection column wirings 2 and the detection row wirings 3 arrayed at the outermost sides of the detection column wirings 2 and the detection row wirings 3 is prevented, by using the dummy column wirings 4 and the dummy row wirings 5. With this arrangement, the parasitic capacitances of the detection column wirings 2 and the parasitic capacitances of the detection row wirings 3 are set uniform. In a second preferred embodiment, parasitic capacitances of detection column wirings 2 and parasitic capacitances of detection row wirings 3 are set uniform, without using dummy column wirings 4 and dummy row wirings 5.

Figure 13:
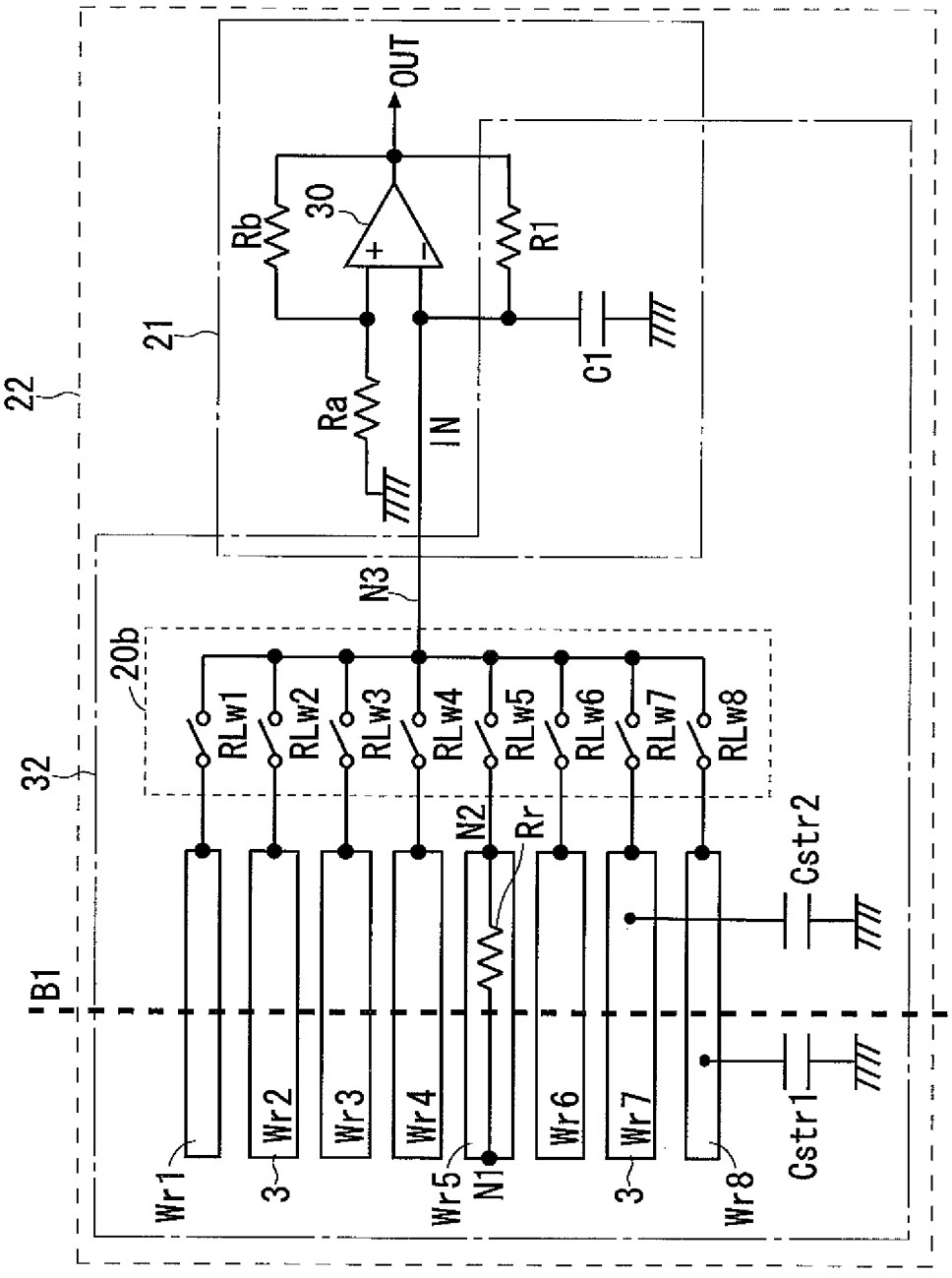
FIG. 13 is a view showing a configuration of a detection oscillation circuit of a touch panel according to a second preferred embodiment.

FIG. 13 is a view showing a configuration of a detection oscillation circuit 22 included in a touch panel according to the second preferred embodiment. In the detection oscillation circuit 22, out of detection row wirings 3 (Wr1 to Wr8), widths of detection row wirings Wr1, Wr8 that are arrayed at outermost sides (both ends) are set smaller than widths of other detection row wirings Wr2 to Wr7.

The detection oscillation circuit 22 according to the present preferred embodiment also has detection column wirings 2 (Wc1 to Wc8) and a column-wiring selection switch circuit 20a actually as shown in FIG. 5. However, the detection column wirings and the row-wiring selection switch circuit are omitted from the drawing to simplify the description.

FIG. 14 is a view showing a part of a cross section along line B1-B2 in FIG. 13, and corresponds to a portion near three detection row wirings (Wr6 to Wr8) at an end out of eight detection row wirings Wr1 to Wr8. Also in this case, it is assumed that a transparent dielectric film 12 like ITO is formed on a lower surface of a base substrate 9, to prevent the touch panel from receiving an influence of noise from the display panel.

As shown in FIG. 14, a parasitic capacitance Cstr2 formed between each of the detection row wirings Wr1 to Wr8 and the dielectric film 12 below these wirings is added to each detection row wiring. Like in the conventional structure (FIG. 8), a parasitic capacitance Cstr3 due to the influence of sneak capacitance at a periphery is added, in addition to a parasitic capacitance Cstr2, to the detection row wirings Wr1, Wr8 at both ends.

However, in the present preferred embodiment, because the widths of the detection row wirings Wr1, Wr8 are smaller than the widths of other detection row wirings Wr2 to Wr7, the parasitic capacitance Cstr2 between the detection row wirings Wr1, Wr8 and the dielectric film 12 becomes smaller than the parasitic capacitance Cstr2 between the other detection row wirings Wr2 to Wr7 and the dielectric film 12. When the parasitic capacitance Cstr2 between the detection row wirings Wr1, Wr8 and the dielectric film 12 is expressed as "Cstr21", a parasitic capacitance Cstr1 (FIG. 13) that is added to the detection row wirings Wr1, Wr8 becomes Cstr21+Cstr3, and a parasitic capacitance that is added to the other detection row wirings Wr2 to Wr7 becomes Cstr2.

In the present preferred embodiment, widths of the detection row wirings Wr1, Wr8 are set such that the parasitic capacitance Cstr1 (Cstr21+Cstr3) of the detection row wirings Wr1, Wr8 becomes equal to the parasitic capacitance Cstr2 of the other detection row wirings Wr2 to Wr7. As a result, the parasitic capacitances become uniform for all the detection row wirings Wr1 to Wr8. Consequently, variations of detection sensitivities of touch capacitances in a column direction can be suppressed, and an effect of improvement of detection precision of the touch is obtained.

For detection column wirings 2 (Wc1 to Wc8), parasitic capacitances can be also set uniform for all the detection wirings 2, by setting widths of detection column wirings 2 (Wc1, Wc8) at both ends smaller than widths of other detection column wirings 2 (Wc2 to Wc7), although the description of this is omitted here. With this arrangement, variations of detection sensitivities of touch capacitances in a row direction can be suppressed, and detection precision of the touch capacitances improves.

In the present preferred embodiment, although the widths of the detection row wirings 3 at both ends are set small, a width of the detection row wiring 3 at only one end can be also set small. In this case, the above effect is obtained for the detection row wiring 3 having the small width. This is also similarly applied to the detection row wirings 2.

In the present invention, the preferred embodiments may be freely combined, or the preferred embodiments may be suitably modified or omitted, within a range of the present invention.

While the present invention has been shown and described in detail, the foregoing description is in all aspects illustrative and not restrictive. It is, therefore, understood that numerous modifications and variations can be devised without departing from the scope of the invention.

What is claimed is:

1. A touch panel comprising
a touch screen including a plurality of detection wirings arrayed in parallel; and
parasitic capacitance setting wiring that is arrayed only in an outer periphery of said touch screen and configured to set parasitic capacitances of an outermost detection wiring out of said plurality of detection wirings equivalent to parasitic capacitances of other detection wirings, wherein
the other detection wirings are interior of the outer periphery of said touch screen, said outer periphery of said touch screen surrounding the plurality of detection wirings,
said parasitic capacitance setting wiring includes one or more dummy wirings arrayed at further outer side of said outermost detection wiring, in parallel with said outermost detection wirings,
shapes and widths of said dummy wirings are the same as those of said plurality of detection wirings, and
an interval between one of said dummy wirings and said outermost detection wiring is the same as an interval between said plurality of detection wirings.

2. The touch panel according to claim 1, wherein each of said plurality of detection wirings and said dummy wirings is made of a bundle of a plurality of metal thin lines.

3. The touch panel according to claim 1, wherein each of said plurality of detection wirings and said dummy wirings is formed of a transparent conductive material.

4. The touch panel according to claim 1, comprising a plurality of detection column wirings extended to a column direction and a plurality of detection row wirings extended to a row direction, as said plurality of detection wirings.

5. The touch panel according to claim 4, further comprising:
a switch circuit that sequentially selects said plurality of detection column wirings and said plurality of detection row wirings;
an oscillation circuit that oscillates in a cycle corresponding to a capacitance component of said detection wiring selected by said switch circuit; and
a coordinate calculating circuit that calculates coordinates of an indicator which touches said touch screen, based on a change of an oscillation cycle of said oscillation circuit.

6. A display device comprising a display panel having said touch screen of the touch panel according to claim 5 arrayed on a front surface.

7. The display device according to claim 6, wherein said touch screen of said touch panel is adhered to a front surface of said display panel.

8. A touch panel comprising
a touch screen including a plurality of detection wirings arrayed in parallel; and
parasitic capacitance setting wiring that is arrayed only in an outer periphery of said touch screen and configured to set parasitic capacitances of an outermost detection wiring out of said plurality of detection wirings equivalent to parasitic capacitances of other detection wirings, wherein
the other detection wirings are interior of the outer periphery of said touch screen, said outer periphery of said touch screen surrounding the plurality of detection wirings,
said parasitic capacitance setting wiring includes one or more dummy wirings arrayed at further outer side of said outermost detection wiring, in parallel with said outermost detection wirings, and
a plurality of said dummy wirings are arrayed at further outer side of said outermost detection wiring in each side of said touch screen.

9. A touch panel comprising
a touch screen including a plurality of detection wirings arrayed in parallel; and
parasitic capacitance setting wiring that is arrayed only in an outer periphery of said touch screen and configured to set parasitic capacitances of an outermost detection wiring out of said plurality of detection wirings equivalent to parasitic capacitances of other detection wirings, wherein
the other detection wirings are interior of the outer periphery of said touch screen,
said parasitic capacitance setting wiring is said outermost detection wiring, and
a width of said outermost detection wiring is formed smaller than those of the other detection wirings.

* * * * *